US006596209B2

(12) United States Patent
Uhland et al.

(10) Patent No.: US 6,596,209 B2
(45) Date of Patent: Jul. 22, 2003

(54) PRODUCTION OF PARTICLE BOARD FROM AGRICULTURAL WASTE

(75) Inventors: Jerry R. Uhland, Marysville, CA (US); David C. Smith, Corvallis, OR (US); William A. Farone, Irvine, CA (US)

(73) Assignee: California AgriBoard LLC, Marysville, CA (US)

(*) Notice: Subject to any disclaimer, the term of this patent is extended or adjusted under 35 U.S.C. 154(b) by 142 days.

(21) Appl. No.: 09/927,186

(22) Filed: Aug. 9, 2001

(65) Prior Publication Data

US 2002/0036365 A1 Mar. 28, 2002

Related U.S. Application Data

(60) Provisional application No. 60/224,407, filed on Aug. 10, 2000.

(51) Int. Cl.[7] .......................... B29B 9/02; B29B 11/12; B29B 15/00

(52) U.S. Cl. ...................... 264/115; 264/118; 264/120; 264/124

(58) Field of Search ................................ 264/109–128

(56) References Cited

U.S. PATENT DOCUMENTS

| | | | | | |
|---|---|---|---|---|---|
| 5,028,286 | A | * | 7/1991 | Hsu | 156/62.4 |
| 5,554,330 | A | | 9/1996 | Flannery et al. | 264/113 |
| 5,656,129 | A | | 8/1997 | Good et al. | 162/13 |
| 5,705,001 | A | * | 1/1998 | Iwata et al. | 156/62.2 |
| 5,779,955 | A | | 7/1998 | Siempelkamp | 264/109 |
| 5,955,023 | A | * | 9/1999 | Ioffe et al. | 264/463 |
| 6,143,220 | A | | 11/2000 | Sullivan et al. | 264/109 |

FOREIGN PATENT DOCUMENTS

| | | |
|---|---|---|
| DE | 43 07 976 A1 | 9/1994 |
| GB | 2 150 436 A | 7/1985 |

* cited by examiner

*Primary Examiner*—Stephen J. Lechert, Jr.
(74) *Attorney, Agent, or Firm*—Cynthia H. O'Donohue

(57) ABSTRACT

The present invention describes a process of using agricultural biomass to make particle or fiberboards. The preferred biomass is selected with high cellulose and hemicellulose concentration and low silica content. The process utilizes short refining time and low steam pressure.

14 Claims, 3 Drawing Sheets

PRODUCTION OF PARTICLE BOARD FROM AGRICULTURAL WASTE

The benefit of U.S. Provisional No. 60/224407, filed Aug. 10, 2000, is hereby claimed.

FIELD OF THE INVENTION

The present invention describes the production of shaped bodies, especially man-made boards, using agricultural waste products.

BACKGROUND OF THE ART

The processes for producing man-board products from cellulosic fibers, especially wood chips or other low quality forest or wood residues are well known to those skilled in the art. However, wood by-products are becoming more expensive and difficult to obtain as the natural wood resources are depleted. Furthermore, particleboards produced from wood residues have been shown to be highly flammable. Therefore, it is highly desirable to replace the wood residues in the board production process with more easily obtainable agricultural waste products that are less expensive, less flammable and can make boards of equal or superior properties.

The production of wood-like particleboard from agricultural waste products such as straws and grasses has been the subject of several prior patents (U.S. Pat. No. 5,656,129, U.S. Pat. No. 5,779,955 and U.S. Pat. No. 5,554,330). These existing processes produce fiberboard that has been shown to have a wide range of variability in its properties due to the range of variability in the natural products. In all of the earlier patents it was assumed that the same amount of binder could be used regardless of the properties of the substrate material. It has also been assumed that the processing conditions described are valid for a wide range of particle sizes, ages of material, and material compositions.

Wheat straw, an abundant and renewable resource, has a number of inherent disadvantages as compared to wood chips and other natural wood residues. Nonetheless, wheat straw has been used in processes that typically rely on wood products. U.S. Pat. No. 5,656,129 provided a method of refining wheat straw to produce fiberboard. However the method required long lengths of straw (2 to 4 inches) and high refining energy of 500 kWh to 1500 kWh per ton.

DEFINITIONS

PARTICLE BOARD shall mean engineered shaped composites, including but not limited to fiberboard products of varying densities and mat boards.

AGRICULTURAL WASTE shall mean cellulosic materials, including but not limited to straws, grasses, rice straw, palm waste, wheat straw, plant waste or paper mill waste. Those of ordinary skill in the art will understand that agricultural waste can also be termed biomass.

SUMMARY OF THE INVENTION

The objective of this instant invention is to overcome some of the existing problems. It was found when materials of higher cellulose and hemicellulose content and lower silica content are selected, materials that have not undergone partial degradation, the processing conditions for high quality board turn out to be surprisingly different than those earlier described.

The possible combinations of various material properties and processing conditions are very large. It is the objective of this instant invention to incorporate the optimum processing parameters relative to the composition of the agricultural material being used. The key features of this instant invention are:

1. Determination of the general chemical composition of the substrate, specifically the cellulose and hemicellulose content, ash content (silica and other inorganics), water content and lignin content,
2. Selection of substrate materials based on the chemical composition,
3. Use of low energy refining to maintain structural integrity in the fiber,
4. Selection of the appropriate particle size to feed the refining process to produce good fiber substrate,
5. And utilization of the minimal amount of resin to achieve the desired bonding.

DETAILED DESCRIPTION OF THE INVENTION

Figure 1:
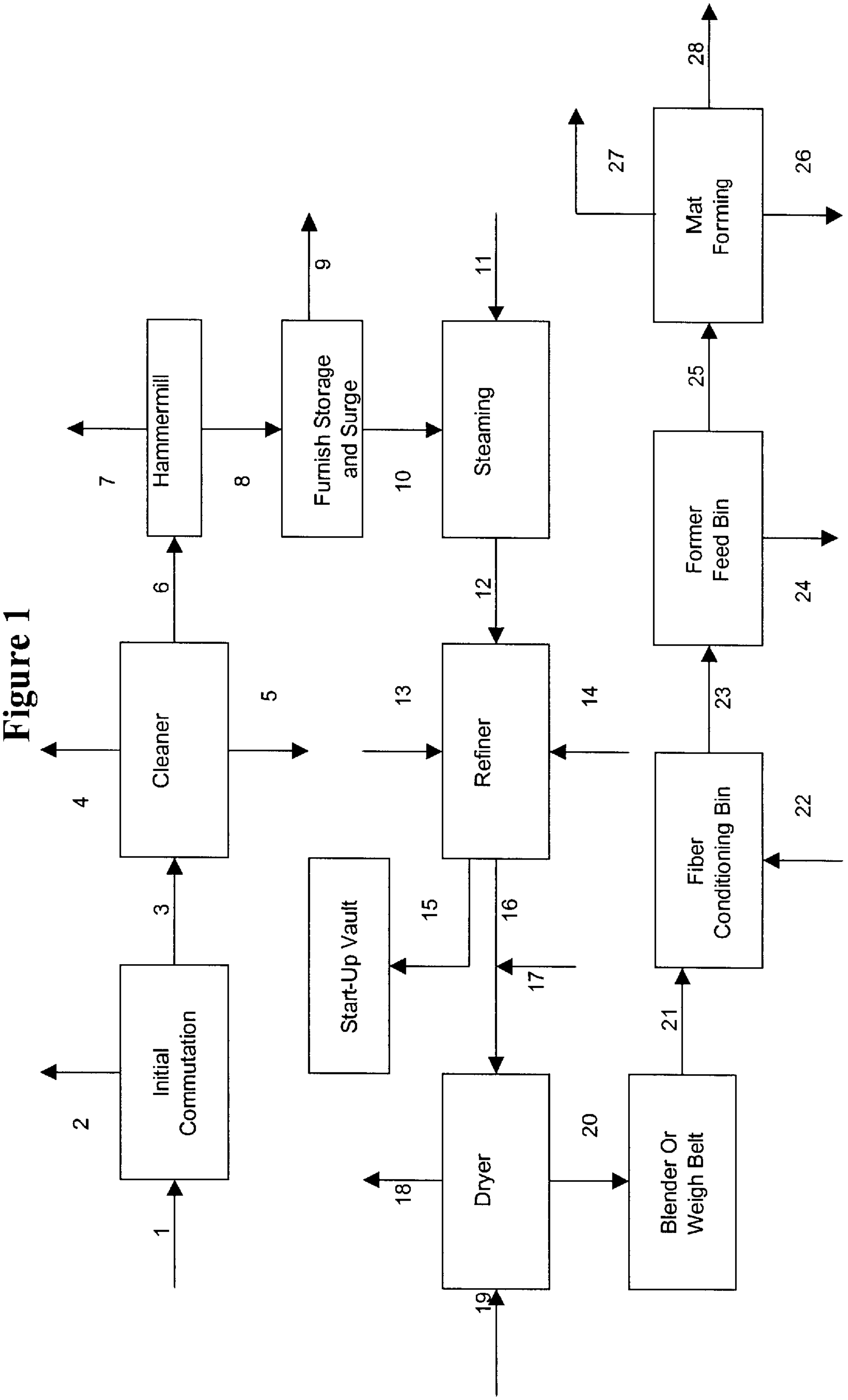
FIGS. 1 and 2 are block diagrams of a fiberboard manufacturing process that uses straw as a raw material to produce fibers and fiberboard material according to the instant invention.
Figure 2:
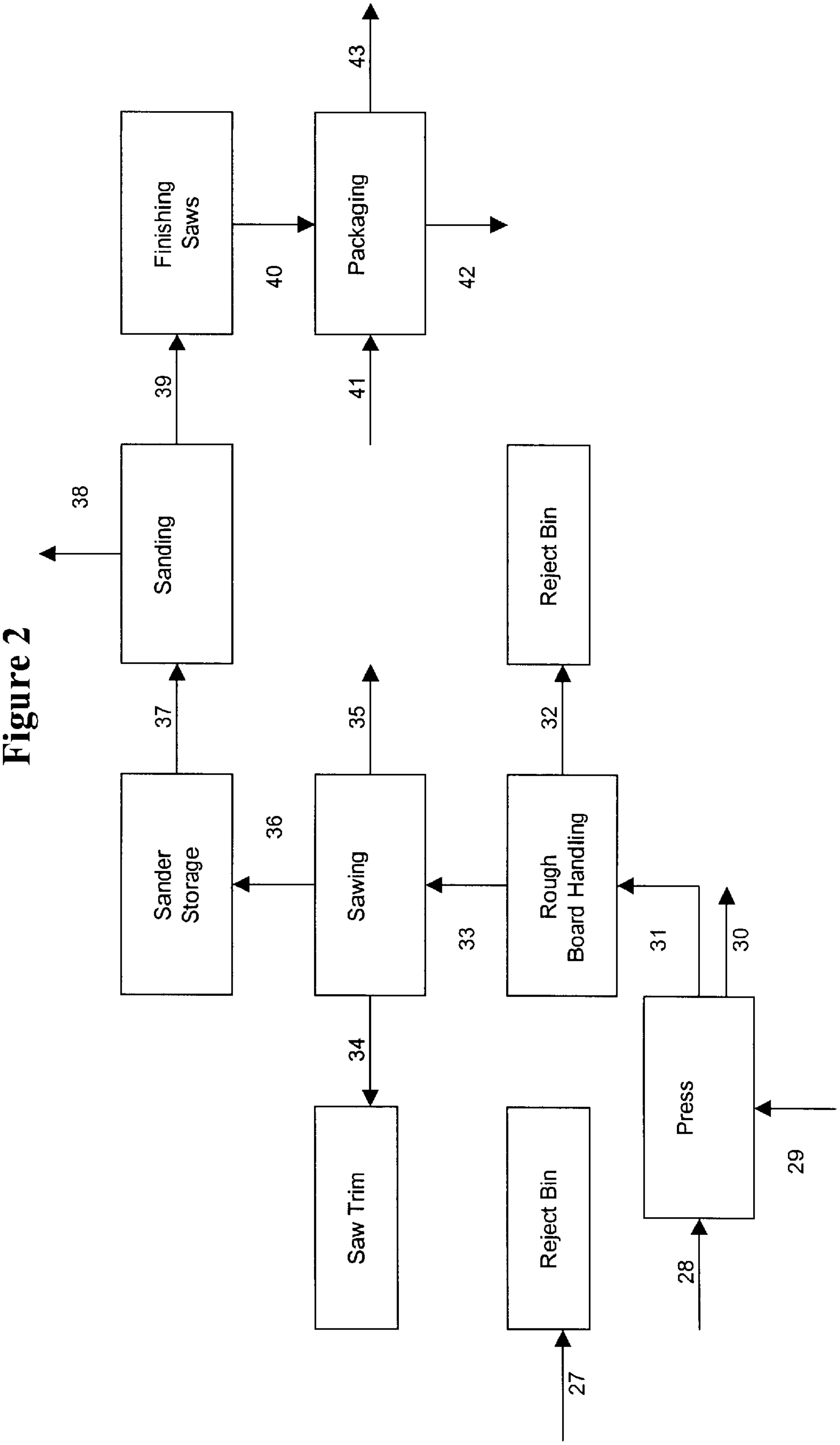

Referring to the FIGS. 1 and 2, a fiberboard manufacturing process is illustrated using straw as furnish. The California Agriboard Process, designated as CAP, performs the function of utilizing straw to produce fiberboard products. Even though rice straw is used to describe the process; in fact, other types of straws and plant residues can be used in the process. Wheat straw and Palm waste are examples of other agricultural wastes that have been used in the process. The process is not limited to these but other materials, such as paper mill waste can also be used. The term particleboard is used to include, but not limited to, engineered composites such as medium density fiber board, particleboard, low-density fiberboard and high-density fiberboard.

Rice straw, which has been cut and baled, is delivered to an input 1 of the CAP. Moisture is removed to less than 15% moisture to assure a relatively dry straw input. In some cases this can be achieved by field drying. The initial commutation will chop the straw into 3 to 6 inch lengths with minimal fines. The fines 2 are removed and the chopped straw 3 is discharged into a cleaner where additional fines, end dust 4 as well as dirt and other solids 5 are removed via a screening process. The screened straw 6 feeds into a hammermill for additional size reduction of stems to ¼ to 2 inch in length, preferably ½ to 1 inch straw in length, with any residual dust, ones, or rocks 7 being removed. The discharged material, now termed "finish" 8, is transported to a storage and surge bin which is provided with a dust collector 9.

The finish 10 is supplied to a steamer where steam 11 is injected as the finish 12 is fed into the refiner. The refiner provides refining energy of 150 to 250 kWh, preferably about 150 kWh/ton, to the furnish 10 to convert it to fiber. The steaming and refining time is typically 5–30 seconds with 20 seconds for the preferred embodiment. As the furnish enters the refiner, wastewater 13 and a wax emulsion 14 of 0.5% to 1.0% with the preferred embodiment using 1% are injected to increase the furnish moisture content to 30% to 50% to aid the refining process. Material 15 that does not meet specifications is rejected and is sent to a start-up vault.

Good material 16 with the addition of resin 17, preferably methyl diisocyanate (MDI) resin, and other special additives such as urea resin or linseed oil, are fed into dryer with a combination of heated and ambient air 19 to maintain material temperatures of 140° F. to 220° F., preferably the temperature is 160° F. The dryer air temperature will not exceed 350° F. with a preferred temperature of 270° F. The furnish while in the dryer will have residual straw fines and dust 18 removed. Water used in a wet electrostatic precipitator discharge for the dryer fans will be accumulated and most of this water can be used as the dilution water 13 in the previous refiner step.

The refined furnish 21 with a moisture content of 8%–15%, preferably 10%–12%, will be sent from the dryer via a weigh belt or blender to the fiber conditioning bin. The conditioning bin will discharge through a fiber conditioning system 24, partially supplied with pre-heated and steam-humidified air 22 mixed with ambient air. The fiber is therein heated to 120° F. to 150° F., preferably to 130° F. and humidified to 8% to 15% moisture with 10%–12% moisture being preferred. The feed 23 is discharged to the former feed bin and the conditioning air 24 is partially recycled or discharged through a filter.

From the former feed bin the feed 25 goes to the mat forming area. Dust 26 is collected from the process and the mat shave-off and reject material 27 collected in the reject hopper and recycled to the fiber conditioning bin. The former is adjustable to produce mats of a required size. The mats 28 are fed to the press where controlled pressure from 400–800 psi is applied to the mat surface with a pressing temperature of 350° F. to 450° F. with the preferred pressing temperature about 400° F. At this point a release agent 29 is applied. The release agent is prepared at a separate mixing station adjacent to the press area. The release agent is typically a water based soap emulsion. Excess water 30 from the press is removed.

The rough boards 31 from the press are sent through handling equipment and checked for quality and thickness. Any rough board rejects 32 are sent to a separate bin for disposal. The good rough boards 33 are sent through rough sizing saws. The saw trim 34 and the dust 35 are removed and later returned to the process by mixing with fresh furnish. The panels 36 are stacked and stored in In-Process storage area until needed for final processing.

The panels 37 are fed to the sander which is configured to produce the required surface finish. Sanded panels 39 are inspected and sorted by grade. Dust 38 from this operation is removed by a low-pressure system is later returned to the process by mixing with fresh fiber 17 or disposed of. The sanded boards 39 are then sent through finishing saws and cut to final dimensions 40 for packaging. Typical packing material used in the industry, such a stickers, cap sheets, edge protectors, steel straps, and pallets 41 are used. Any board 42 rejected during this process is removed. All good product 43 packaged in standard packaging for this industry is then shipped to the market via appropriate transportation.

The processing steps of sanding, grading and final sawing are not limited to the order given but may be performed in any desired order.

As noted above, the chemical composition of the raw material can affect the final product. While chemical analyses for these properties can be carried out to select the appropriate substrate materials, a quick and simple infrared analytical technique was developed to measure the key parameters of the agricultural material. There is a clear correlation between the cellulose content, silica content, and the strength of the particleboard fabricated. Selection of raw material characteristics allows one to choose the appropriate raw material, resin, and additive formulation to produce the required fiberboard. Materials selected by the methods described below can be used in the process to produce high quality board.

Rice straw is used as the example in the method but the use of the described method is not limited to rice straw and may be used for other potential raw materials. The rice straw samples were ground very fine and then mixed quantitatively with an internal standard mixture plus diluent solid. A pellet is formed by compression and infrared measurements are taken. These steps are well known to those skilled in the art. The internal standard mixture is approximately 6% KSCN (by weight) in KBr. The KBr is transparent in the mid-infrared region and thus acts only as a diluent.

The KSCN peak is at approximately 2060 $cm^{-1}$ in all spectra and is present to account for any differences in pellet thickness and weight. To quantify cellulose, the ratio of the peak height at 2890 $cm^{-1}$ to that at 2060 $cm^{-1}$ is taken and compared to the calibration curves. Similarly silica is quantified by taking the ratio of the peak height at 790 $cm^{-1}$ to that at 2060 $cm^{-1}$ and comparing to the calibration. Cellulose is calibrated using the C-H stretching peak at 2890 $cm^{-1}$, while silica calibration utilizes the peak at 790 $cm^{-1}$. Chemically pure samples of cellulose and silica are used in making the calibration curves. Various known ratios of the chemically pure samples to the standard are used.

FTIR analysis of the rice straw samples indicated that the 1997 crop year (baled and chopped) samples are on the average lower in their cellulose content relative to the 1999 crop year samples.

Figure 3:
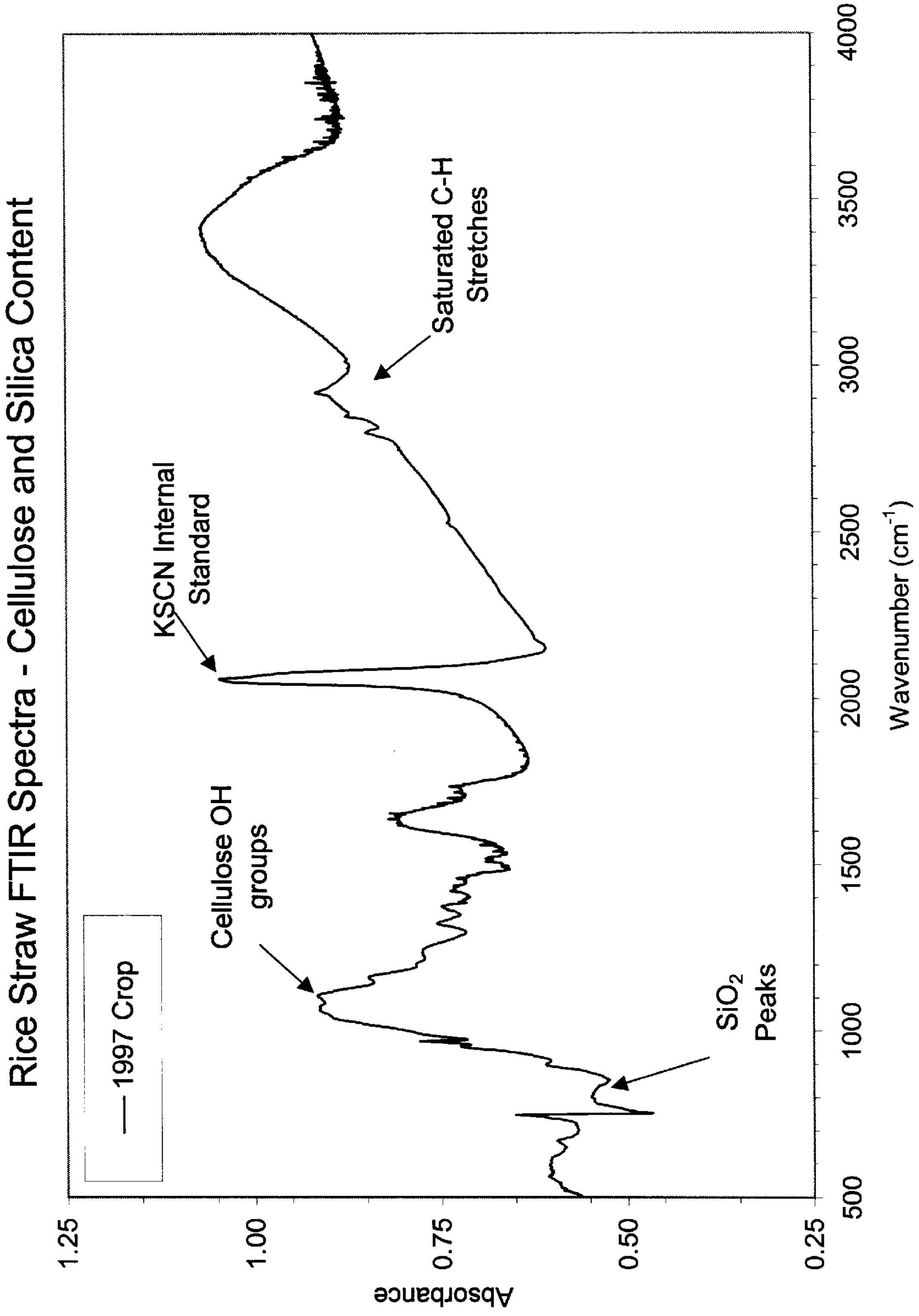
FIG. 3 shows a typical FTIR Spectrum of a rice straw samples from the 1997 crop year.

FIG. 3 shows a typical FTIR Spectrum of a rice straw samples from the 1997 crop year.

The silica content in the 1997 crop year baled and chopped rice straw is higher as the 1999 crop year samples. This is an indication that the 1997 samples have probably undergone decomposition. The 1997 and 1999 crop year samples were from the same approximate location near Sacramento, Calif. It is expected that samples from different locations will have differing ratios due to soil composition, farming practices, weather conditions, and age of material to name a few of the variables affecting the composition. There are clear correlations between the sample cellulose content, silica content, and the strength of the particleboard fabricated from the rice straw.

EXAMPLE 1

Production of Medium Density Fiberboard

Lots of approximately 1,000 pounds of rice straw were used to make medium density fiberboard. The board was made to ½" thickness. The straw was dried to 9–11% moisture. The refiner was held at 5 bar pressure and digested for 15 seconds. The MDI resin was used at 5% and 1% of wax emulsion was added. The inlet to the dryer was at 160° C. and the outlet was 90° C. The dryer residence time was 4–6 seconds. A cold prepress was used for 30 seconds with a target density of 50 pounds/$ft^3$. The final press was made at 180° C. for 13 seconds per mm of thickness (approximately 160–170 seconds). Three different rice straw batches were used differing in their average combined cellulose and hemicellulose content. As received for measurement before any drying Batch A was the lowest at about 66%, Batch B at 71% and Batch C at 75%. Silica values are in reverse order with C having the lowest silica at 9.1%, B at 12.8 and A at 15.6%. After the boards were made they were subjected to various standard mechanical properties tests. The results are shown in Table 1.

While the fiberboard made from A and B is acceptable, the board made from C is clearly superior. Repeat measurements on board samples show that the board with the better cellulose plus hemicellulose and lower silica values is stronger in all test categories.

TABLE 1

Mechanical Properties of Medium Density Fiberboard

| Property | A | B | C |
|---|---|---|---|
| Modulus of Rupture (psi) | 1,669 | 2,354 | 3,715 |
| | 2,182 | 3,619 | 3,276 |
| | 2,144 | | 3,012 |
| | | | 3,417 |
| Average | 1,998 | 2,987 | 3,355 |
| Modulus of Elasticity (psi) | 315,000 | 378,000 | 374,000 |
| | 293,000 | 303,000 | 357,000 |
| | 254,000 | | 399,000 |
| | | | 330,000 |
| Average | 287,333 | 340,500 | 365,000 |
| Internal Bonding (psi) | 59 | 60 | 103 |
| | 62 | 48 | 141 |
| | 26 | | 97 |
| | | | 153 |
| Average | 49 | 54 | 124 |
| Screw Holding (lbs) | 235 | 237 | 367 |
| | 236 | 242 | 355 |
| | 181 | | 415 |
| | | | 367 |
| Average | 217 | 240 | 376 |

EXAMPLE 2

Production of Medium Density Fiberboard

Boards were made form rice straw batch C under similar conditions to those of Example 1. In this case only 3.5% of the MDI resin was used. The other conditions were essentially the same except the final pressing time was 12 seconds per mm at 210° C. The results are given in Table 2 compared to the values for the 5.0% boards.

The C rice straw batch provides boards that are comparable to the A and B batches with less resin.

TABLE 2

Mechanical Properties of Medium Density Fiberboard

| Property | 3.5% C | 5.0% A | 5.0% B | 5.0% C |
|---|---|---|---|---|
| Modulus of Rupture (psi) | 3,378 | 1,998 | 2,987 | 3,355 |
| Modulus of Elasticity (psi) | 389,000 | 287,333 | 340,000 | 365,000 |
| Internal Bonding (psi) | 53 | 49 | 54 | 125 |
| Screw Holding (lbs) | 191 | 217 | 240 | 376 |

We claim:

1. A method of producing wood-like particle board,
 a. comprising an agricultural waste with a high combined cellulose plus hemicellulose content and with low silica content;
 b. reducing size of said waste by grinding under steam pressure to reduce size of particles;
 c. adding a binding resin to mixture;
 d. drying said particle and resin mixture in an oven to remove excess water;
 e. pressing said particle and resin mixture in one or more stages to board dimensions; and
 f. trimming and sanding said board to final product specifications.

2. The method of claim 1 wherein said grinding is accomplished by a refiner and refining time is five to 25 seconds.

3. The method of claim 2 wherein said refining time is 15 seconds.

4. The method of claim 2 wherein steam at less than 7 bar pressure is used in said refiner and refining time is about 15 seconds.

5. The method of claim 1 which comprises adding up to 5% resin.

6. The method of claim 5 wherein 3.5% resin is used.

7. The method of claim 5 wherein said resin is methyl diisocyanate.

8. A method of producing wood-like fiber board,
 a. comprising an agricultural biomass with a high combined cellulose plus hemicellulose content and with silica content less than 18%;
 b. reducing size of said biomass by refining for 5 to 25 seconds under low steam pressure to produce elongated fibers in a fiber mixture;
 c. adding a binding resin to said fiber mixture;
 d. drying said fiber and resin mixture in an oven to remove excess water;
 e. cold prepressing and pressing said fiber and resin mixture in two or more stages to board dimensions; and
 f. trimming and sanding the board to final product specifications.

9. The method of claim 8 wherein said agricultural biomass contains less than 10% silica.

10. The method of claim 8 wherein the concentration of combined cellulose and hemicellulose is at least 75%.

11. The method of claim 8 wherein said low pressure steam in refiner is 5 bar or less.

12. The method of claim 8 wherein refining time is 15 seconds.

13. The method of claim 8 wherein up to 5% resin is added.

14. The method of claim 13 wherein 3.5% resin is used.

* * * * *